US011983014B2

(12) United States Patent
Chou et al.

(10) Patent No.: US 11,983,014 B2
(45) Date of Patent: May 14, 2024

(54) METHOD FOR SWITCHING BASE STATION OF MOWER, MOWER AND MULTI-BASE STATION WORKING SYSTEM

(71) Applicant: Willand (Beijing) Technology Co., LTD., Beijing (CN)

(72) Inventors: Boxing Chou, Beijing (CN); Tianning Yu, Beijing (CN); Zichong Chen, Beijing (CN)

(73) Assignee: Willand (Beijing) Technology Co., LTD., Beijing (CN)

( * ) Notice: Subject to any disclaimer, the term of this patent is extended or adjusted under 35 U.S.C. 154(b) by 0 days.

(21) Appl. No.: 18/348,767

(22) Filed: Jul. 7, 2023

(65) Prior Publication Data
US 2024/0012426 A1     Jan. 11, 2024

(30) Foreign Application Priority Data
Jul. 8, 2022 (CN) .......................... 202210800123.8

(51) Int. Cl.
    G05D 1/00 (2006.01)
(52) U.S. Cl.
    CPC ......... G05D 1/0274 (2013.01); G05D 1/0225 (2013.01)
(58) Field of Classification Search
    CPC .............. A01D 34/008; A01D 2101/00; A01D 34/006; G05D 1/0225; G05D 1/0274; G05D 2201/0208; G05D 1/0268; G05D 1/0272; G05D 1/0276; G05D 1/0219; H04W 36/00; H04W 64/00; H04W 4/44; H04W 84/06
    See application file for complete search history.

(56) References Cited

U.S. PATENT DOCUMENTS

| 5,944,132 A | 8/1999 | Davies et al. |
| 10,200,882 B1 * | 2/2019 | Nelapati ................. H04W 4/44 |
| 2014/0323130 A1 | 10/2014 | Kowshik et al. |

(Continued)

FOREIGN PATENT DOCUMENTS

| CN | 108142069 A | 6/2018 |
| CN | 108613671 A | 10/2018 |
| CN | 109151938 A | 1/2019 |

(Continued)

*Primary Examiner* — Bao Long T Nguyen
(74) *Attorney, Agent, or Firm* — Emerson, Thomson & Bennett, LLC; Roger D. Emerson; Peter R. Detorre

(57) ABSTRACT

A method for switching a base station, a mower and a multi-base station working system are provided. The method includes: obtaining, when the number of first common-view satellites between the mower and a first base station is less than a first threshold, the number of second common-view satellites between the mower and a second base station; when the number of the first common-view satellites is less than a second threshold and the number of the second common-view satellites is greater than the second threshold, obtaining the first trajectory of the mower based on the first base station and the second trajectory of the mower based on the second base station; determining, based on the first and second trajectories, a coordinate transformation matrix; and switching from the first base station to the second base station based on the coordinate transformation matrix, the second threshold being less than the first threshold.

18 Claims, 5 Drawing Sheets

(56) References Cited

U.S. PATENT DOCUMENTS

2019/0335415 A1 10/2019 Fu et al.
2020/0271749 A1 8/2020 Wu et al.

FOREIGN PATENT DOCUMENTS

| CN | 112924998 A | 6/2021 |
| CN | 114616972 A | 6/2022 |
| EP | 4179862 A1 | 5/2023 |
| EP | 4201173 A1 | 6/2023 |
| JP | 2017083212 A | 5/2017 |
| WO | 2018108115 A1 | 6/2018 |
| WO | 2021063398 A1 | 4/2021 |

* cited by examiner

METHOD FOR SWITCHING BASE STATION OF MOWER, MOWER AND MULTI-BASE STATION WORKING SYSTEM

CROSS-REFERENCE TO RELATED APPLICATIONS

The present application claims priority to Chinese application No. 202210800123.8 filed on Jul. 8, 2022, and entitled "METHOD FOR SWITCHING BASE STATION OF MOWER, MOWER AND MULTI-BASE STATION WORKING SYSTEM", the complete disclosure of which is incorporated by reference herein.

TECHNICAL FIELD

The present disclosure relates to the technical field of positioning, in particular to a method for switching a base station of a mower, a mower and a multi-base station working system.

BACKGROUND

A mower is usually based on real time kinematic (RTK) carrier phase difference technology, realizes a fast and high-precision positioning function based on synchronous satellite observation data of a base station and the mower.

Residences or other buildings are mostly involved in the application scenarios of a mower which block satellite signals. When the mower is in different orientations of a blocking source, the number of its observable satellites may vary very significantly due to blocking of the blocking source, and some users may not be able to set up the base station of the mower in a high place for various reasons, or even only place the base station in a certain corner, resulting in a very limited satellite observable orientation of the base station. Due to the above reasons, the number of common-view satellites that are observable by both the mower and the base station is not sufficient to achieve reliable RTK positioning during working of the mower, resulting in inaccurate positioning of the mower and affecting working effect of the mower.

SUMMARY

In view of the above problems, embodiments of the present disclosure are proposed, providing a method for switching a base station of a mower, a mower and a multi-base station working system, to solve at least the above problems.

One or more embodiments of the present disclosure provide a method for switching a base station of a mower, the method including: obtaining, when the number of first common-view satellites between the mower and a first base station is less than a first threshold, the number of second common-view satellites between the mower and a second base station; when the number of the first common-view satellites is less than a second threshold and the number of the second common-view satellites is greater than the second threshold, obtaining a first trajectory of the mower based on/with the first base station and a second trajectory of the mower based on/with the second base station, respectively; determining, based on the first trajectory and the second trajectory, a coordinate transformation matrix of the mower switching from the first base station to the second base station; and switching the mower from the first base station to the second base station based on the coordinate transformation matrix, the second threshold being less than the first threshold.

Alternatively, the obtaining the number of second common-view satellites between the mower and a second base station, includes: obtaining the number of candidate common-view satellites between the mower and at least one candidate base station, the candidate base station being a base station in the base stations other than the first base station; and selecting a maximum number of the number of candidate common-view satellites as the number of the second common-view satellites between the mower and the second base station.

Alternatively, the obtaining the first trajectory of the mower based on the first base station and the second trajectory of the mower based on the second base station, respectively, includes: determining a target position of the mower where the number of the first common-view satellites is greater than a third threshold and the number of the second common-view satellites is greater than the third threshold; and obtaining coordinate points of the target position based on the first base station as the first trajectory, and obtaining coordinate points of the target position based on the second base station as the second trajectory, the third threshold being less than the first threshold and greater than the second threshold.

Alternatively, the obtaining the first trajectory of the mower based on the first base station and the second trajectory of the mower based on the second base station, respectively, further includes: causing the mower to operate based on a sensor on the mower when the number of the first common-view satellites is less than the second threshold and the number of the second common-view satellites is less than the second threshold; and using a trajectory positioned with the sensor on the mower as the first trajectory based on the first base station when the number of the second common-view satellites is greater than the second threshold.

Alternatively, the obtaining the first trajectory of the mower based on the first base station and the second trajectory of the mower based on the second base station, respectively, includes: collecting coordinate points of the mower based on a preset frequency; determining a first coordinate point where the number of the first common-view satellites is less than or equal to the first threshold as a starting point of the first trajectory and the second trajectory; and determining a first coordinate point where the number of the first common-view satellites is less than or equal to the second threshold as an end point of the first trajectory and the second trajectory.

According to another aspect of the present disclosure, a method for switching a base station of a mower is provided. The method includes: determining, based on a number of common-view satellites between the mower and each of the base stations in a working area, the mower enters a cross-dominance area of the working area, the working area comprising at least a plurality of sub-areas, each of the sub-areas being provided with one of the base stations, the sub-area comprising the cross-dominance area, the cross-dominance area being an area where a number of common-view satellites between the mower and all the base stations is less than a preset threshold; determining a base station that is used for positioning the mower before the mower enters the cross-dominance area as a first base station, and determining a second base station based on a number of common-view satellites between the mower and each candidate base station after the mower enters the cross-dominance area, the candidate base station being a base station other than the first base station in the base stations; determining a first trajectory based on coordinate points of the mower positioned with the first base station in the cross-dominance area and a second trajectory based on coordinate points of the mower positioned with the second base station in the cross-dominance area; and switching the mower from the first base station to the second base station based on the first trajectory and the second trajectory.

Alternatively, the determining a first trajectory of the mower based on coordinate points positioned with the first base station in the cross-dominance area, and determining a second trajectory of the mower based on coordinate points positioned with the second base station, includes: obtaining the number of second common-view satellites between the mower and the second base station, when the number of first common-view satellites between the mower and the first base station is less than a first threshold; and obtaining the coordinate points positioned with the first base station as the first trajectory of the mower and the coordinate points positioned with the second base station as the second trajectory of the mower respectively, when the number of the first common-view satellites is less than a second threshold and the number of the second common-view satellites is greater than the second threshold, the second threshold being less than the first threshold.

Alternatively, the obtaining the coordinate points positioned with the first base station as the first trajectory of the mower and the coordinate points positioned with the second base station as the second trajectory of the mower respectively, includes: determining a first target position of the mower where the number of the first common-view satellites is greater than a third threshold, and a second target position of the mower where the number of the second common-view satellites is greater than the third threshold respectively, the third threshold being less than the first threshold and greater than the second threshold; and acquiring coordinate points positioned with the first base station between the first target position and the second target position as the first trajectory, and coordinate points positioned with the second base station as the second trajectory.

Alternatively, the obtaining the coordinate points positioned with the first base station as the first trajectory of the mower and the coordinate points positioned with the second base station as the second trajectory of the mower respectively, includes: collecting coordinate points of the mower based on a preset frequency; determining, when a first number of the first common-view satellites is less than or equal to the first threshold, the coordinate points positioned with the first base station as a starting point of the first trajectory, and the coordinate points positioned with the second base station as a starting point of the second trajectory; and determining, when a first number of the first common-view satellites is less than or equal to the second threshold, the coordinate points positioned with the first base station as an end point of the first trajectory, and the coordinate points positioned with the second base station as an end point of the second trajectory.

Alternatively, the method further includes: causing the mower to operate based on a sensor on the mower, when the number of the first common-view satellites is less than the second threshold and the number of the second common-view satellites is less than the second threshold; and using coordinate points positioned with the sensor on the mower as the first trajectory, when the number of the second common-view satellites is greater than the second threshold.

Alternatively, the using coordinate points positioned with the sensor on the mower as the first trajectory, when the number of the second common-view satellites is greater than the second threshold, includes: acquiring, when the number of the second common-view satellites is greater than the second threshold, the coordinate points of the mower positioned with the sensor on the mower, until the number of the second common-view satellites is greater than the first threshold; and using the coordinate points positioned with the sensor on the mower as the first trajectory.

Alternatively, the switching the mower from the first base station to the second base station based on the first trajectory and the second trajectory, includes: determining a coordinate transformation matrix based on the first trajectory and the second trajectory, where the coordinate transformation matrix is used for transforming coordinates of the mower positioned with the first base station to coordinates positioned with the second base station; and switching the mower from the first base station to the second base station based on the coordinate transformation matrix.

Alternatively, the determining a second base station based on the number of common-view satellites between the mower after entering the cross-dominance area and each candidate base station, includes: obtaining the number of candidate common-view satellites between the mower and at least one candidate base station; and selecting a base station having the highest number of the candidate common-view satellites between the mower as the second base station.

According to another aspect of the present disclosure, an apparatus for switching a base station of a mower, including a collection module, a calculation module and a switching module. The collection module is configured to obtain, when the number of first common-view satellites between the mower and a first base station is less than a first threshold, the number of second common-view satellites between the mower and a second base station; when the number of the first common-view satellites is less than a second threshold and the number of the second common-view satellites is greater than the second threshold, obtain a first trajectory of the mower based on the first base station and a second trajectory of the mower based on the second base station, respectively. The calculation module is configured to determine, based on the first trajectory and the second trajectory, a coordinate transformation matrix of the mower switching from the first base station to the second base station. The switching module is configured to switch the mower from the first base station to the second base station based on the coordinate transformation matrix, the second threshold being less than the first threshold.

Alternatively, the collection module includes an acquisition unit and a selection unit. The acquisition unit is configured to obtain the number of candidate common-view satellites between the mower and at least one candidate base station, the candidate base station being a base station in the base stations other than the first base station. The selection unit is configured to select a maximum number of the number of candidate common-view satellites as the number of the second common-view satellites between the mower and the second base station.

Alternatively, the acquisition unit is further configured to: determine a target position of the mower where the number of the first common-view satellites is greater than a third threshold and the number of the second common-view satellites is greater than the third threshold; and obtain coordinate points of the target position based on the first base station as the first trajectory, and obtain coordinate points of the target position based on the second base station as the second trajectory, the third threshold being less than the first threshold and greater than the second threshold.

According to another aspect of the present disclosure, a non-transitory computer readable storage medium storing computer instructions is provided, where the computer instructions are used to cause the computer to perform the method according to the above aspect.

According to another aspect of the present disclosure, a mower is provided, including: a body, a cutterhead and a driving wheel; one or more processors; and a memory storing a program; where the program includes instructions, and the instructions, when executed by the processor, cause the processor to perform the method according to the above aspect.

According to another aspect of the present disclosure, a multi-base station working system, including: a mower and a plurality of base stations; where the mower is adapted to acquire a map of a working area of the mower, the map of the working area includes at least one blocking source, and the working area is divided into a plurality of sub-areas based on a position of the blocking source; each of the plurality of the sub-areas is provided with one of the base stations respectively, the sub-area includes an absolute-dominance area and a cross-dominance area, the absolute-dominance area is an area where the mower has the number of common-view satellites greater than or equal to a preset threshold with only one of the base stations, and the cross-dominance area is an area where the mower has the number of common-view satellites less than the preset threshold with all of the base stations; and the mower switches between the base stations in the cross-dominance area, to perform mowing in the working area by performing the method according to any method discussed above.

According to another aspect of the present disclosure, an electronic device is provided, including: one or more processors; and a memory storing a program; where, the program includes instructions, the instructions, when executed by the processor, cause the processor to perform the method according to the above aspect.

The present disclosure provides a method for switching a base station, a mower and a multi-base station working system, obtains the number of second common-view satellites between the mower and a second base station, when the number of first common-view satellites between the mower and a first base station is less than a first threshold; when the number of the first common-view satellites is less than a second threshold and the number of the second common-view satellites is greater than the second threshold, obtains the first trajectory of the mower based on the first base station and the second trajectory of the mower based on the second base station, respectively; determines a coordinate transformation matrix of the mower switching from the first base station to the second base station, based on the first trajectory and the second trajectory; and switches the mower from the first base station to the second base station based on the coordinate transformation matrix, the second threshold being less than the first threshold. By setting a plurality of base stations and switching between base stations based on the number of common-view satellites between the mower and the base stations, thus ensuring that the number of common-view satellites between the mower and the base stations can achieve reliable RTK positioning, the mower can maintain accurate positioning and has better working effect.

BRIEF DESCRIPTION OF THE DRAWINGS

In order to more clearly illustrate technical schemes of embodiments of the present disclosure or in the existing technologies, accompanying drawings to be used in the description of the embodiments or the existing technologies will be briefly introduced below. Apparently, the accompanying drawings in the following description are some embodiments of the present disclosure, and other accompanying drawings may also be obtained based on these accompanying drawings for those of ordinary skills in the art without making creative work.

REFERENCE NUMERALS

600: Apparatus for switching a base station of a mower; 601: collection module; 602: calculation module; 603: switching module; 700: electronic device; 701: calculation unit; 702: ROM; 703: RAM; 704: bus; 705: input/output interface; 706: input unit; 707: output unit; 708: storage unit; and 709: communication unit.

DETAILED DESCRIPTION OF EMBODIMENTS

In order to enable those skilled in the art to better understand technical schemes of the present disclosure, with reference to the accompanying drawings in embodiments of the present disclosure, technical schemes of the embodiments of the present disclosure will be clearly and completely described below. Apparently, the described embodiments are only some embodiments, instead of all embodiments, of the present disclosure. All other embodiments obtained by those of ordinary skills in the art based on the embodiments of the present disclosure without making creative work shall fall within the scope of protection of the present disclosure.

In order to facilitate understanding, before specific embodiments of the present disclosure are described in detail, an application scenario of a method for switching a base station of a mower, a mower and a multi-base station operating method in the present disclosure will be first illustrated.

Figure 5A:
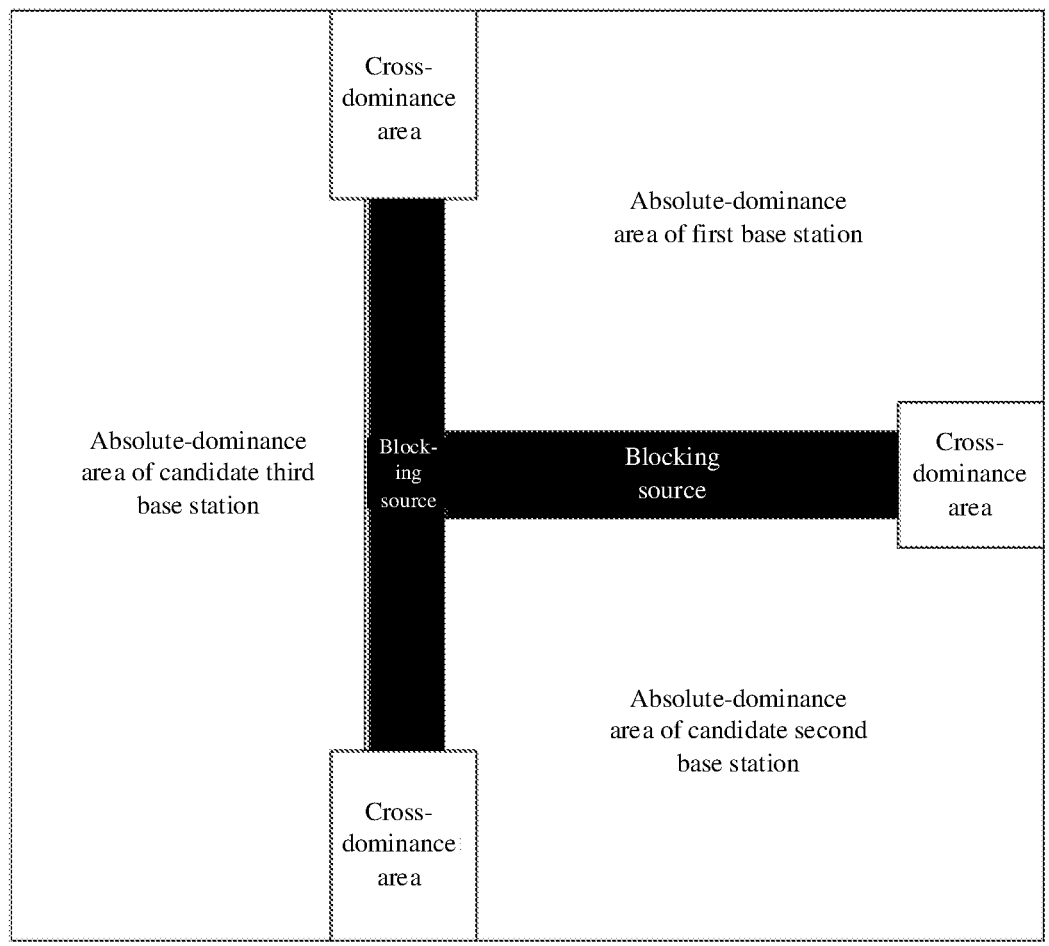
FIG. 5A to FIG. 5C are diagrams of application scenarios of the method for switching a base station of a mower in an embodiment of the present disclosure.

For example, FIG. 5A is a top view of a working scenario of a mower, a blocking source divides the whole working scenario of the mower into three areas, and each of the areas may be provided with a base station. The mower does not have a sufficient number of common-view satellites at most working sites in each area and at other base stations other than the base station in that area, and RTK positioning at these working sites can only rely on the base station in that area, thus belonging to an absolute-dominance area of the base station, such as the absolute-dominance area of a first base station, the absolute-dominance area of a second base station and the absolute-dominance area of a third base station in the figure.

In addition, each of the three areas has a cross-dominance area with the other two areas, and the number of common-view satellites between the mower and the first base station, the mower and the second base station may change when the mower enters the cross-dominance area from the absolute-dominance area. In order to achieve reliable RTK positioning, base station switching may be implemented by using the method for switching a base station of a mower in the present disclosure.

Figure 5B:
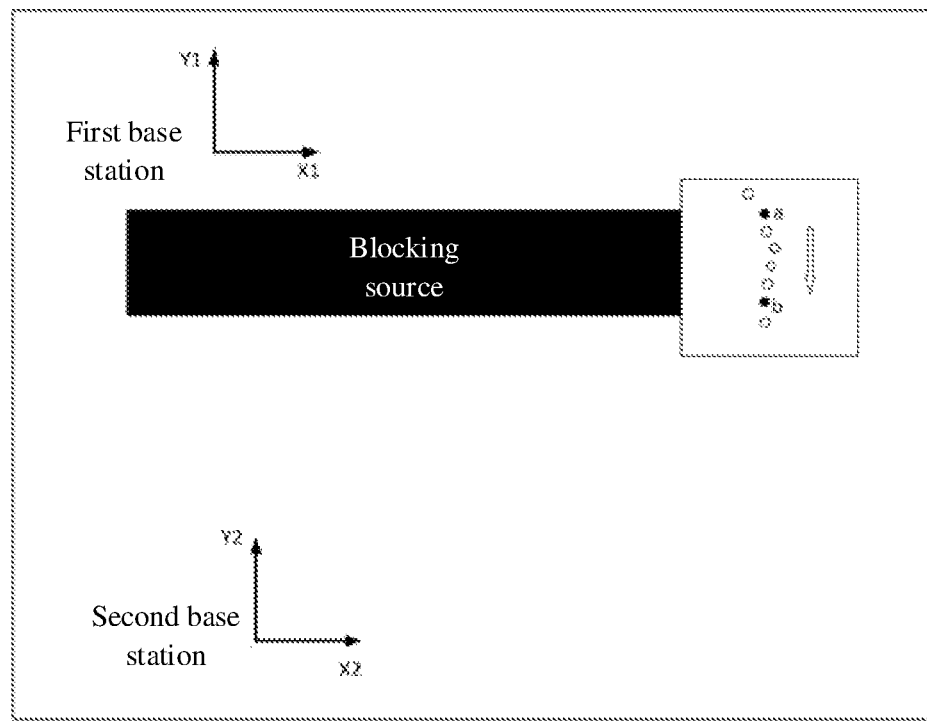

Referring to FIG. 5B, in one case, the blocking source in the working scenario of the mower divides the working area into two parts, such as front and back yards of a yard, and the first base station and the second base station are provided in each of the two parts respectively. The above application scenario will be described below in exemplary embodiments of the present disclosure.

It should be noted that the method for switching a base station of a mower of the present disclosure may be applied to other mobile robots having base stations in addition to applied to mowers, to enable the mobile robots to switch between a plurality of base stations. The present disclosure is only illustrated using a mower as an example, and does not serve as a limitation to an application scope and application scenario of the method of the present disclosure.

The specific embodiments of the present disclosure will be described in detail below with reference to the accompanying drawings.

Figure 1:
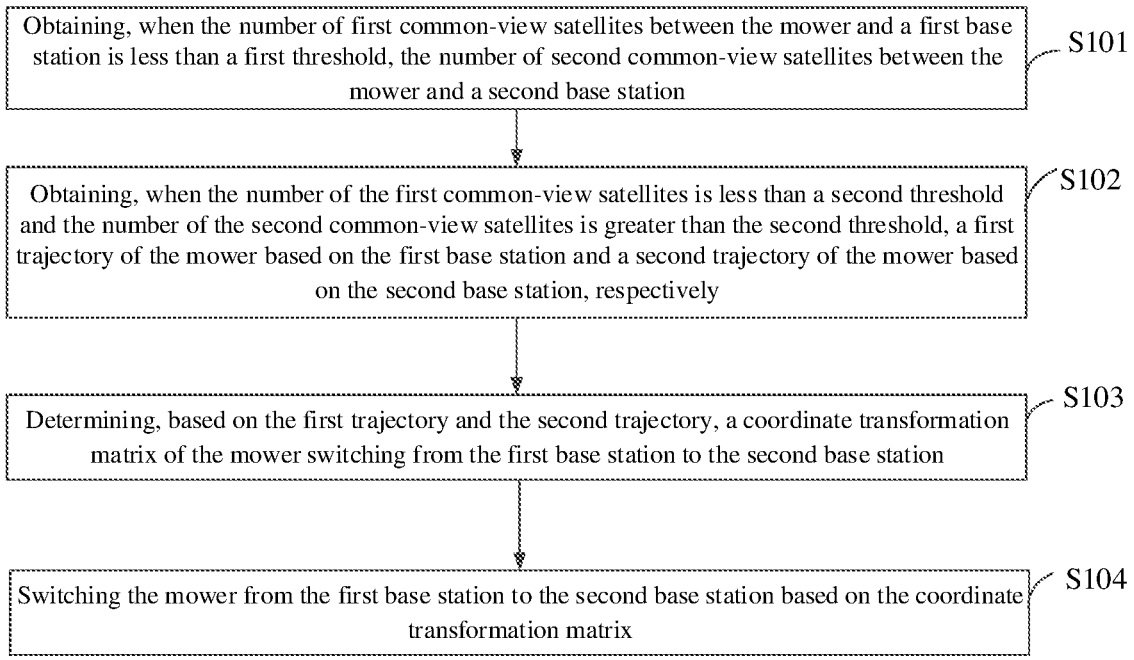
FIG. 1 is a schematic flowchart of a method for switching a base station of a mower in an exemplary embodiment of the present disclosure.

FIG. 1 is a schematic flowchart of a method for switching a base station of a mower in an exemplary embodiment of the present disclosure. As shown in the figure, the present embodiment mainly includes the following steps:

S101, obtaining, when the number of first common-view satellites between the mower and a first base station is less than a first threshold, the number of second common-view satellites between the mower and a second base station.

In some specific implementations of the present disclosure, referring to FIG. 5B, the first threshold is used to determine whether the mower enters a cross-dominance area of the first base station and the second base station. For example, the mower operates in an absolute-dominance area of the first base station, and it may be determined whether the number of the first common-view satellites between the mower and the first base station is less than the first threshold. If yes, it indicates that the mower enters the cross-dominance area of the first base station and the second base station, then, start acquiring the number of the second common-view satellites between the mower and the second base station.

Specifically, the first threshold may be obtained using experiments.

The present embodiment in the present disclosure determines whether the mower enters the cross-dominance area from the absolute-dominance area based on that the number of the first common-view satellites between the mower and the first base station is less than the first threshold, and obtains the number of the second common-view satellites between the mower and the second base station only when the mower enters the cross-dominance area. When the number of the first common-view satellites between the mower and the first base station is greater than or equal to the first threshold, the mower still operates in the absolute-dominance area of the first base station, then there is no need to obtain the number of the second common-view satellites between the mower and the second base station, and the mower does not need to switch between the base stations.

Step 102, obtaining, when the number of the first common-view satellites is less than a second threshold and the number of the second common-view satellites is greater than the second threshold, a first trajectory of the mower based on the first base station and a second trajectory of the mower based on the second base station, respectively.

Figure 5C:
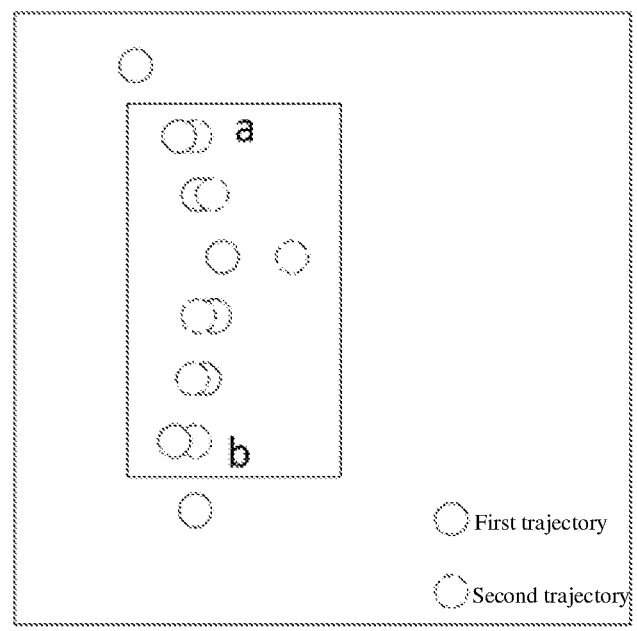

In some specific implementations of the present disclosure, referring to FIG. 5B, the second threshold is used to determine whether the mower is about to leave the cross-dominance area of the first base station and the second base station. For example, after the mower enters the cross-dominance area of the first base station and the second base station through step S101, the first trajectory of the mower based on the first base station and the second trajectory of the mower based on the second base station may be respectively generated by acquiring the number of the first common-view satellites and the number of the second common-view satellites at the same time. Since the second threshold is less than the first threshold, when the number of the first common-view satellites is less than the second threshold and the number of the second common-view satellites is greater than the second threshold, it indicates that the mower is about to leave the cross-dominance area of the first base station and the second base station. As shown in FIG. 5C, the first trajectory of the mower based on the first base station and the second trajectory of the mower based on the second base station described above are acquired.

Specifically, step S102 includes:

Step S1021, collecting coordinate points of the mower based on a preset frequency.

Step S1022, determining a first coordinate point where the number of the first common-view satellites is less than or equal to the first threshold as a starting point of the first trajectory and the second trajectory.

Step S1023, determining a first coordinate point where the number of the first common-view satellites is less than or equal to the second threshold as an end point of the first trajectory and the second trajectory.

Exemplarily, referring to FIG. 5C, the mower collects its coordinate points based on the preset frequency, for example, the preset frequency may be 10 coordinate points collected in 1 second, and the first coordinate point where the number of the first common-view satellites is less than or equal to the first threshold is a coordinate point where the mower enters the cross-dominance area. The present embodiment in the present disclosure uses this coordinate point based on the first base station and based on the second base station as the starting point of the first trajectory and the second trajectory, respectively. Similarly, the first coordinate point where the number of the first common-view satellites is less than or equal to the second threshold is a coordinate point where the mower leaves the cross-dominance area. The present embodiment in the present disclosure uses this coordinate point based on the first base station and based on the second base station as the end point of the first trajectory and the second trajectory respectively, and acquiring all the coordinate points between the starting point and the end point may obtain the first trajectory and the second trajectory.

Through the above implementation, the number of coordinate points of the first trajectory and the second trajectory may be acquired as needed, and the starting point and end point of the first trajectory and the second trajectory may be accurately acquired, facilitating subsequent calculation of a coordinate transformation matrix.

S103, determining, based on the first trajectory and the second trajectory, a coordinate transformation matrix of the mower switching from the first base station to the second base station.

Exemplarily, referring to FIG. 5C, a plurality of pairs of coordinate points may be collected randomly from the first trajectory and the second trajectory, for example, 5 pairs may be selected. The plurality of pairs of coordinate points refer to coordinate points corresponding to each other in the first trajectory and the second trajectory. In the coordinate system, a difference between the above 5 pairs of coordinate points may be made to obtain 5 sets of coordinate transformation matrices t between the first base station and the second base station: calculating an average value of the above 5 sets of coordinate transformation matrices as the best estimated coordinate transformation matrix t this time; transforming coordinate points on the second trajectory to the first trajectory using the above best estimated coordinate transformation matrix t, counting the number of coordinate points n whose errors with the corresponding coordinate points on the first trajectory are in a certain range and a standard deviation std of the corresponding errors; and recording the above best estimated coordinate transformation matrix t, the number of coordinate points n and the standard deviation std of the errors. The above steps are repeated until the number of iterations exceeds a preset threshold, and the best estimated coordinate transformation matrix t in a set of recorded data having the largest n is selected from an iteration record and determined as the coordinate transformation matrix of the mower switching from the first base station to the second base station; when the n of the plurality of sets of recorded data is the same, the best estimated coordinate transformation matrix t in a set of recorded data having the smallest standard deviation std of the errors is selected and determined as the coordinate transformation matrix of the mower switching from the first base station to the second base station.

Through the above embodiment, a plurality of best estimated coordinate transformation matrices t are calculated, from which a set of best estimated coordinate transformation matrices t meeting the above requirements is selected as the coordinate transformation matrix of the mower switching from the first base station to the second base station, so that the coordinate transformation matrix has smaller errors and higher accuracy, thus making the trajectory of the mower after switching more accurate.

S104, switching the mower from the first base station to the second base station based on the coordinate transformation matrix.

Exemplarily, based on the coordinate transformation matrix determined in the above step S104, a coordinate value of the mower at the second base station is converted to a coordinate value of the mower at the first base station, so that the trajectories of the mower may be unified after the mower enters the absolute-dominance area of the second base station, thereby completing the switching of the mower from the first base station to the second base station.

To sum up, the present embodiment in the present disclosure ensures that the number of common-view satellites between the mower and the base stations can achieve reliable RTK positioning, by setting a plurality of base stations and switching between base stations based on the number of common-view satellites between the mower and the base stations, so that the mower can maintain accurate positioning during the working to achieve better working effect.

Figure 2:
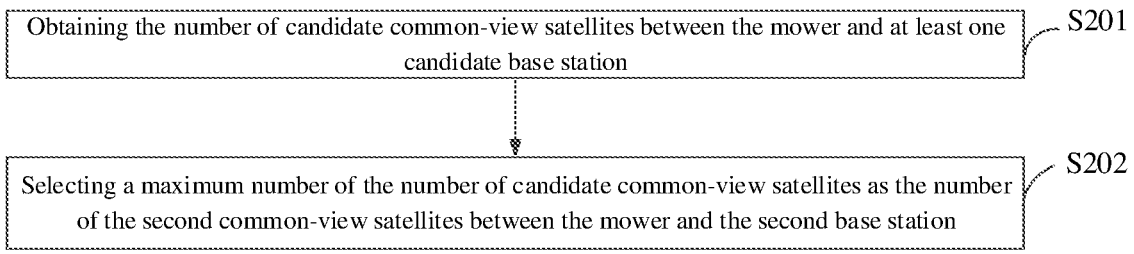
FIG. 2 is a schematic flowchart of the method for switching a base station of a mower in another exemplary embodiment of the present disclosure.

FIG. 2 is a schematic flowchart of the method for switching a base station of a mower in another exemplary embodiment of the present disclosure. The present embodiment mainly illustrates a specific implementation of the above step S101. As shown in the figure, the present embodiment mainly includes the following steps:

S201, obtaining the number of candidate common-view satellites between the mower and at least one candidate base station.

Specifically, the candidate base station is a base station other than the first base station in the base stations.

S202, selecting a maximum number of the number of candidate common-view satellites as the number of the second common-view satellites between the mower and the second base station.

Exemplarily, referring to FIG. 5A, when the mower enters the cross-dominance area of the first base station and the second base station, the number of common-view satellites between the base station other than the first base station and the mower is monitored, for example, when the mower enters the cross-dominance area of the first base station and a candidate second base station, the other base stations may be the candidate second base station and a candidate third base station. The base station having the highest number of common-view satellites is selected from the other base stations as the second base station, i.e., the candidate second base station is selected as the second base station to acquire the number of the second common-view satellites between the mower and the second base station.

The present embodiment selects the second base station by the number of common-view satellites, which may ensure that the number of common-view satellites between the mower and the selected base station is sufficient to achieve reliable RTK positioning, thus improving an accuracy of coordinate transformation between the first base station and the second base station.

Figure 3:
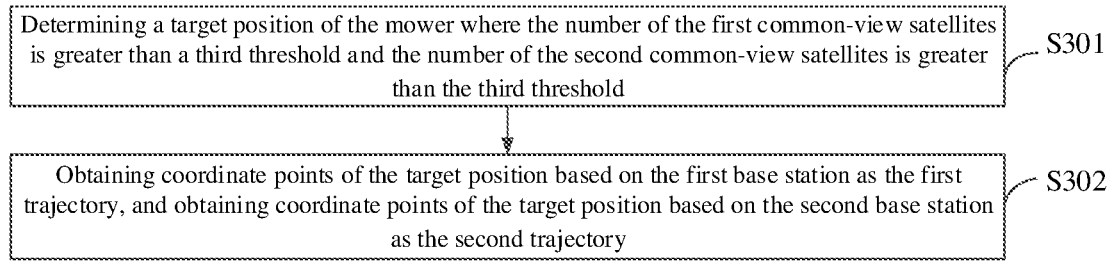
FIG. 3 is a schematic flowchart of the method for switching a base station of a mower in another exemplary embodiment of the present disclosure.

FIG. 3 is a schematic flowchart of the method for switching a base station of a mower in another exemplary embodiment of the present disclosure. The present embodiment mainly illustrates a specific implementation of the above step S102. As shown in the figure, the present embodiment mainly includes the following steps:

S301, determining a target position of the mower where the number of the first common-view satellites is greater than a third threshold and the number of the second common-view satellites is greater than the third threshold.

S302, obtaining coordinate points of the target position based on the first base station as the first trajectory, and obtaining coordinate points of the target position based on the second base station as the second trajectory.

Specifically, referring to FIG. 5C, the third threshold is less than the first threshold and greater than the second threshold. The third threshold is used to determine a target position a and a target position b. Coordinate points where the number of the first common-view satellites based on the first base station is greater than the third threshold and the number of the second common-view satellites is greater than the third threshold (i.e., coordinate points between the target position a and the target position b) are selected as the first trajectory of the mower. Similarly, coordinate points where the number of the first common-view satellites based on the second base station is greater than the third threshold and the number of the second common-view satellites is greater than the third threshold (i.e., the coordinate points between the target position a and the target position b) are selected as the second trajectory of the mower.

The present embodiment selects the coordinate points between the target position a and the target position b as the first trajectory and the second trajectory, eliminates coordinate points where both the number of first common-view satellites and the number of second common-view satellites are small, further reduces errors of calculating the coordinate transformation matrix, and improves the accuracy of coordinate transformation between the first base station and the second base station.

Figure 4:
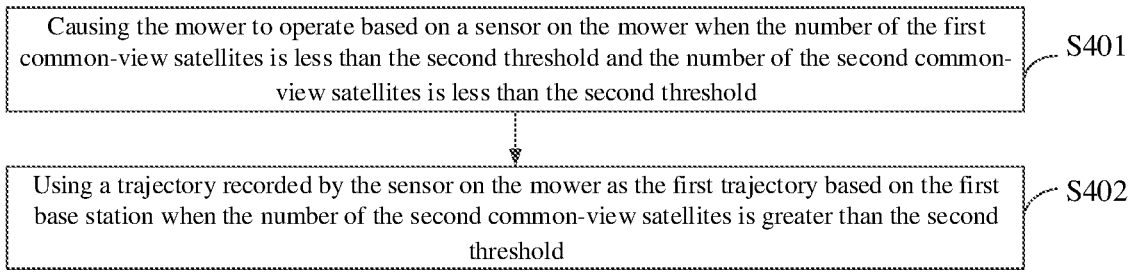
FIG. 4 is a schematic flowchart of the method for switching a base station of a mower in another exemplary embodiment of the present disclosure.

FIG. 4 is a schematic flowchart of the method for switching a base station of a mower in another exemplary embodiment of the present disclosure. The present embodiment mainly illustrates a specific implementation of the above step S102. As shown in the figure, the present embodiment mainly includes the following steps:

S401, causing the mower to operate based on a sensor on the mower, when the number of the first common-view satellites is less than the second threshold and the number of the second common-view satellites is less than the second threshold.

S402, Using a trajectory positioned with the sensor on the mower as the first trajectory based on the first base station when the number of the second common-view satellites is greater than the second threshold.

Specifically, when no coordinate point where the number of the first common-view satellites is greater than the second threshold and the number of the second common-view satellites is greater than the second threshold can be acquired, then coordinate points of the mower recorded with the sensor on the mower are used as the first trajectory, until coordinate points where the number of the second common-view satellites is greater than the second threshold can be acquired.

Exemplarily, the sensor on the mower may be an inertial measurement unit, a vision sensor, a LIDAR, etc., which is not limited in the present disclosure.

The present embodiment records the coordinate points as the first trajectory with the sensor on the mower, which may avoid the existence of coordinate points where the number of the first common-view satellites is less than the second threshold and at the same time the number of the second common-view satellites is less than the second threshold, making the calculation of the coordinate transformation matrix between the first base station and the second base station impossible, when the cross-dominance area overlaps too little or even there is no cross-dominance area.

Figure 6:
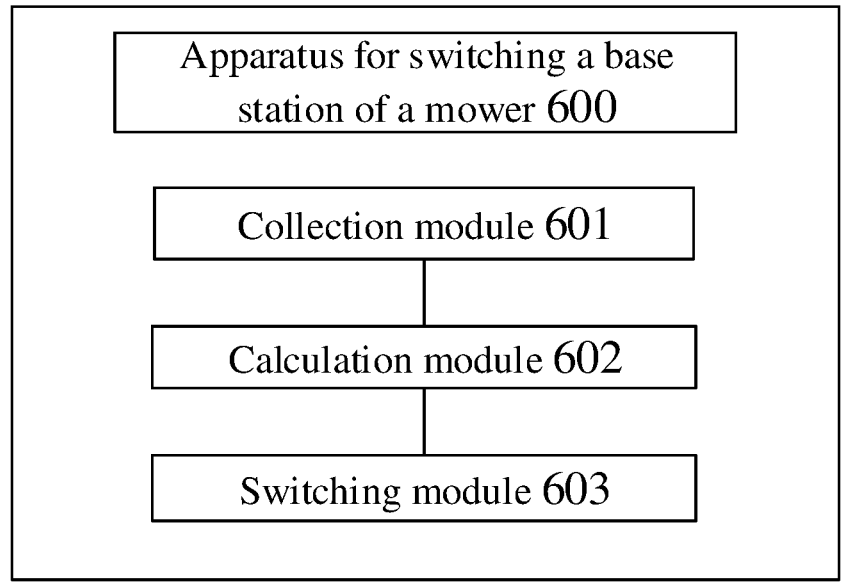
FIG. 6 is a structural block diagram of an apparatus for switching a base station of a mower in an exemplary embodiment of the present disclosure.

FIG. 6 is a structural block diagram of an apparatus for switching a base station of a mower in an exemplary embodiment of the present disclosure.

The apparatus 600 for switching a base station of a mower in the present embodiment may be loaded in a mower, where the mower may be adapted to executing a task of switching the base station of the mower.

As shown in the figure, the apparatus 600 for switching a base station of a mower in the present embodiment mainly includes: a collection module 601, a calculation module 602 and a switching module 603.

The collection module 601, is configured to obtain, when the number of first common-view satellites between the mower and a first base station is less than a first threshold, the number of second common-view satellites between the mower and a second base station; when the number of the first common-view satellites is less than a second threshold and the number of the second common-view satellites is greater than the second threshold, obtain a first trajectory of the mower based on the first base station and a second trajectory of the mower based on the second base station, respectively.

The calculation module 602, is configured to determine, based on the first trajectory and the second trajectory, a coordinate transformation matrix of the mower switching from the first base station to the second base station.

The switching module 603, is configured to switch the mower from the first base station to the second base station based on the coordinate transformation matrix, the second threshold being less than the first threshold.

Alternatively, the collection module 601 includes an acquisition unit and a selection unit. The acquisition unit is configured to obtain the number of candidate common-view satellites between the mower and at least one candidate base station, the candidate base station being a base station in the base stations other than the first base station. The selection unit is configured to select a maximum number of the number of candidate common-view satellites as the number of the second common-view satellites between the mower and the second base station.

Alternatively, the acquisition unit is further configured to: determine a target position of the mower where the number of the first common-view satellites is greater than a third threshold and the number of the second common-view satellites is greater than the third threshold; and obtain coordinate points of the target position based on the first base station as the first trajectory, and obtain coordinate points of the target position based on the second base station as the second trajectory, the third threshold being less than the first threshold and greater than the second threshold.

In addition, the apparatus 600 for switching a base station of a mower in the present embodiment of the present disclosure may be further configured to implement other steps in each of the aforementioned method embodiments for switching a base station of a mower, and has the beneficial effects of the corresponding method step embodiments, detailed description thereof will be omitted.

An exemplary embodiment of the present disclosure further provides a non-transitory computer readable storage medium storing computer instructions, where the computer instructions are used to cause a computer to perform the method in the embodiments of the present disclosure.

An exemplary embodiment of the present disclosure further provides a computer program product, including a computer program, where the computer program, when executed by a processor of a computer, causes the computer to perform the method in the embodiments of the present disclosure.

An exemplary embodiment of the present disclosure further provides a mower, including: a body, a cutterhead and a driving wheel; one or more processors; and a memory storing a program; where the program includes instructions, and the instructions, when executed by the processor, cause the processor to perform the method in the embodiments of the present disclosure.

An exemplary embodiment of the present disclosure further provides a multi-base station working system, including: a mower and a plurality of base stations; where the mower is adapted to acquire a map of a working area of the mower, the map of the working area includes at least one blocking source, and the working area is divided into a plurality of sub-areas based on a position of the blocking source; each of the plurality of the sub-areas is provided with one of the base stations respectively, the sub-area includes an absolute-dominance area and a cross-dominance area, the absolute-dominance area is an area where the mower has the number of common-view satellites greater than or equal to a preset threshold with only one of the base stations, and the cross-dominance area is an area where the mower has the number of common-view satellites less than the preset threshold with all of the base stations; and the mower switches between the base stations in the cross-dominance area, to perform mowing in the working area by implementing the method discussed above.

Exemplarily, referring to FIG. 5A, in the multi-base station working system, there are two blocking sources in the acquired working area of the mower, an area division subsystem may divide the working area into 3 sub-areas based on the position of the blocking sources. Each of the sub-areas may be provided with one of the base stations, such as a first base station, a candidate second base station and a candidate third base station, each of the sub-areas may include the absolute-dominance area and the cross-dominance area, the preset threshold may be a minimum number of common-view satellites that can achieve reliable RTK positioning, the absolute-dominance area indicates that in the area, the mower has the number of common-view satellites greater than or equal to the preset threshold with only one base station, that is, in the absolute-dominance area, the mower can achieve reliable RTK positioning with only one base station, and cannot achieve reliable RTK positioning with all other base stations; the cross-dominance area indicates that in the area, the number of common-view satellites between the mower and all the base stations is less than the preset threshold, that is, in the cross-dominance area, the mower cannot achieve reliable RTK positioning with all the base stations. By performing the method in the above embodiments, the mower may switch between the above 3 base stations in the cross-dominance area to perform mowing in the working area.

For example, starting from the absolute-dominance area of the first base station, the mower is switched from the first base station to the candidate second base station in the cross-dominance area using the method for switching a base station of a mower in the above embodiments, so that the mower enters the absolute-dominance area of the candidate second base station to work. Similarly, the mower is switched from the candidate second base station to the candidate third base station using the method for switching a base station of a mower in the above embodiments, so that the mower enters the absolute-dominance area of the candidate third base station to work. The present embodiment may implement two-by-two switching between the first base station, the candidate second base station and the candidate third base station. In addition, the present embodiment is only an exemplary illustration and does not serve as a limitation on the number of blocking sources, the number of base stations, or the number of subareas.

An exemplary embodiment of the present disclosure further provides an electronic device, including: one or more processors; and a memory storing a program; where the program includes instructions, and the instructions, when executed by the processor, cause the processor to perform the method in the embodiments of the present disclosure.

Figure 7:
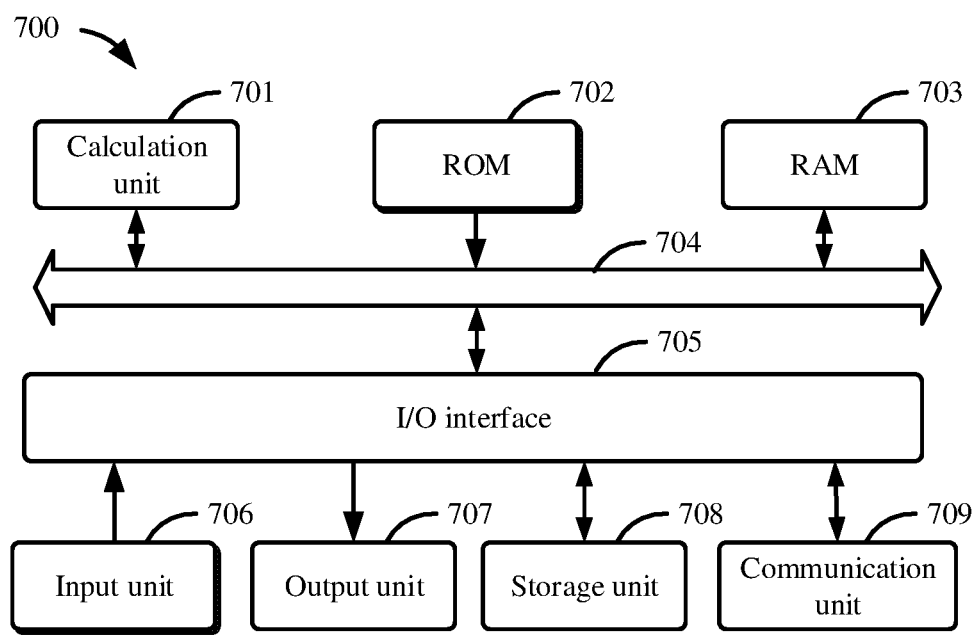
FIG. 7 is a structural block diagram of an electronic device of a mower in an exemplary embodiment of the present disclosure.

Referring to FIG. 7, a structural block diagram of an electronic device 700 that can serve as a server or a client of the present disclosure will now be described, which is an example of a hardware device that can be applied to various aspects of the present disclosure. The electronic device is intended to represent various forms of electronic digital computing devices, such as a laptop computer, a desktop computer, a workbench, a personal digital assistant, a server, a blade server, a mainframe computer, and other suitable computers. The electronic device may further represent various forms of mobile apparatuses, such as a personal digital assistant, a cellular phone, a smart phone, a wearable device, and other similar computing apparatuses. The components shown herein, the connections and relationships thereof, and the functions thereof are merely used as examples, and are not intended to limit implementations of the present disclosure described and/or claimed herein.

As shown in FIG. 7, the electronic device 700 includes a computing unit 701, which may execute various appropriate actions and processes in accordance with a computer program stored in a read-only memory (ROM) 702 or a computer program loaded into a random-access memory (RAM) 703 from a storage unit 708. The RAM 703 may further store various programs and data required by operations of the device 700. The computing unit 701, the ROM 702, and the RAM 703 are connected to each other through a bus 704. An input/output (I/O) interface 705 is also connected to the bus 704.

A plurality of components in the electronic device 700 is connected to the I/O interface 705, including: an input unit 706, an output unit 707, a storage unit 708, and a communication unit 709. The input unit 706 may be any type of device capable of inputting information to the electronic device 700, and the input unit 706 may receive inputted digital information or character information, and generate key signal input related to user settings and/or function control of the electronic device. The output unit 707 may be any type of device capable of presenting information, and may include, but is not limited to, a display, a speaker, a video/audio output terminal, a vibrator, and/or a printer. The storage unit 704 may include, but is not limited to, a magnetic disk and an optical disk. The communication unit 709 allows the electronic device 700 to exchange information/data with other devices through a computer network such as the Internet and/or various telecommunication networks, and may include, but is not limited to, a modem, a network card, an infrared communication device, a wireless communication transceiver and/or a chipset, such as a Bluetooth™ device, a WiFi device, a WiMax device, a cellular communication device, and/or an analog.

The computing unit 701 may be various general-purpose and/or special-purpose processing components having a processing power and a computing power. Some examples of the computing unit 701 include, but are not limited to, a central processing unit (CPU), a graphics processing unit (GPU), various special-purpose artificial intelligence (AI) computing chips, various computing units running a machine learning model algorithm, a digital signal processor (DSP), and any appropriate processor, controller, microcontroller, and the like. The computing unit 701 executes various methods and processes described above. For example, in some embodiments, the method for switching a base station of a mower in the above embodiments may be implemented as a computer software program that is tangibly included in a machine-readable medium, such as the storage unit 708. In some embodiments, some or all of the computer programs may be loaded and/or installed onto the electronic device 700 via the ROM 702 and/or the communication unit 709. In some embodiments, the computing unit 701 may be configured to execute the method for switching a base station of a mower by any other appropriate approach (e.g., by means of firmware).

Figure 8:
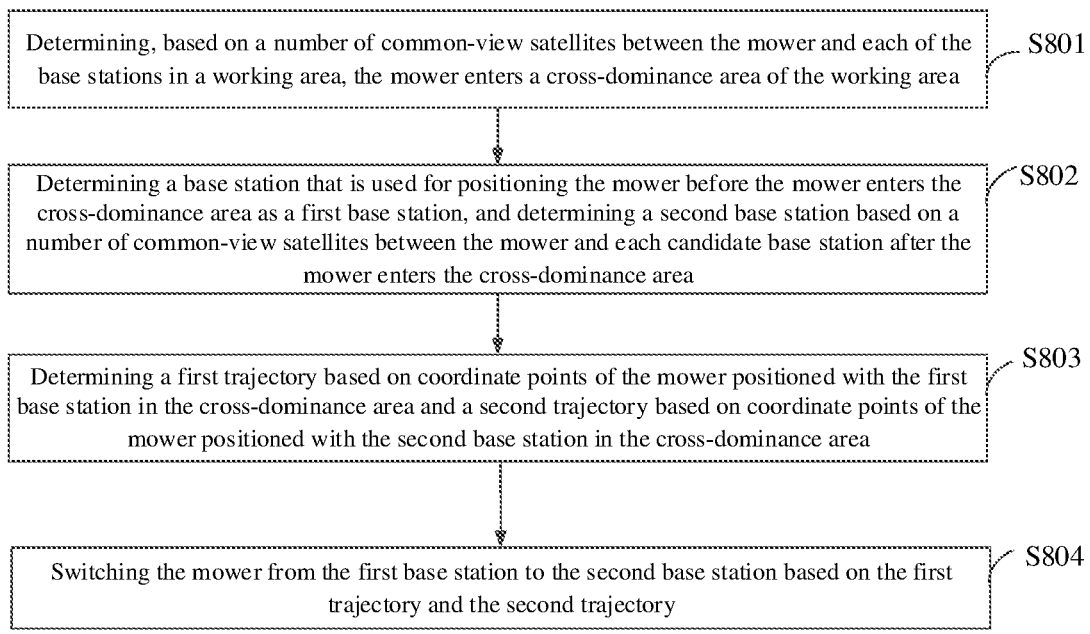
FIG. 8 is a schematic flowchart of the method for switching a base station of a mower in another exemplary embodiment of the present disclosure.

FIG. 8 is a schematic flowchart of the method for switching a base station of a mower in another exemplary embodiment of the present disclosure. The present embodiment provides a method for switching a base station of a mower, including:

S801, determining, based on a number of common-view satellites between the mower and each of the base stations in a working area, the mower enters a cross-dominance area of the working area.

Here, the working area of the mower includes at least a plurality of sub-areas, each of the sub-areas is provided with one of the base stations, the sub-area includes the cross-dominance area. The cross-dominance area is an area where the number of common-view satellites between the mower and all of the base stations is less than a preset threshold.

S802, determining a base station that is used for positioning the mower before the mower enters the cross-dominance area as a first base station, and determining a second base station based on a number of common-view satellites between the mower and each candidate base station after the mower enters the cross-dominance area.

The candidate base station is a base station other than the first base station in the base stations.

S803, determining a first trajectory based on coordinate points of the mower positioned with the first base station in the cross-dominance area and a second trajectory based on coordinate points of the mower positioned with the second base station in the cross-dominance area.

S804, switching the mower from the first base station to the second base station based on the first trajectory and the second trajectory.

Alternatively, the determining a first trajectory based on coordinate points of the mower positioned with the first base station in the cross-dominance area, and determining a second trajectory based on coordinate points positioned with the second base station, includes: obtaining the number of second common-view satellites between the mower and the second base station when the number of first common-view satellites between the mower and the first base station is less than a first threshold; and obtaining the coordinate points positioned with the first base station as the first trajectory of the mower and the coordinate points positioned with the second base station as the second trajectory of the mower respectively, when the number of the first common-view satellites is less than a second threshold and the number of the second common-view satellites is greater than the second threshold, the second threshold being less than the first threshold.

Alternatively, the obtaining the coordinate points positioned with the first base station as the first trajectory of the mower and the coordinate points positioned with the second base station as the second trajectory of the mower respectively, includes: determining a first target position of the mower where the number of the first common-view satellites between the mower and the first base station is greater than a third threshold, and a second target position of the mower where the number of the second common-view satellites between the mower and the second base station is greater than the third threshold respectively, the third threshold being less than the first threshold and greater than the second threshold; and acquiring coordinate points of the mower positioned with the first base station between the first target position and the second target position as the first trajectory, and coordinate points of the mower positioned with the second base station as the second trajectory.

Alternatively, the obtaining the coordinate points positioned with the first base station as the first trajectory of the mower and the coordinate points positioned with the second base station as the second trajectory of the mower respectively, includes: collecting coordinate points of the mower based on a preset frequency; determining, when a first number of the first common-view satellites is less than or equal to the first threshold, the coordinate points of the mower positioned with the first base station as a starting point of the first trajectory, and the coordinate points of the mower positioned with the second base station as a starting point of the second trajectory; and determining, when a first number of the first common-view satellites is less than or equal to the second threshold, the coordinate points of the mower positioned with the first base station as an end point of the first trajectory, and the coordinate points of the mower positioned with the second base station as an end point of the second trajectory.

Alternatively, the method further includes: causing the mower to operate for positioning based on a sensor on the mower when the number of the first common-view satellites is less than the second threshold and the number of the second common-view satellites is less than the second threshold; and using coordinate points positioned with the sensor on the mower as the first trajectory when the number of the second common-view satellites is greater than the second threshold.

Alternatively, the using coordinate points positioned with the sensor on the mower as the first trajectory, when the number of the second common-view satellites is greater than the second threshold, includes: acquiring, when the number of the second common-view satellites is greater than the second threshold, the coordinate points of the mower positioned with the sensor on the mower, until the number of the second common-view satellites is greater than the first threshold; and using the coordinate points positioned with the sensor on the mower as the first trajectory.

Alternatively, the switching the mower from the first base station to the second base station based on the first trajectory and the second trajectory, includes: determining a coordinate transformation matrix based on the first trajectory and the second trajectory, where the coordinate transformation matrix is used for transforming coordinates of the mower positioned with the first base station to coordinates positioned with the second base station; and switching the mower from the first base station to the second base station based on the coordinate transformation matrix.

Alternatively, the determining a second base station based on the number of common-view satellites between the mower after entering the cross-dominance area and each candidate base station, includes: obtaining the number of candidate common-view satellites between the mower and at least one candidate base station; and selecting a base station having the highest number of the candidate common-view satellites between the mower as the second base station.

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, partially executed as a separate software package on a machine and partially executed on a remote machine, or completely executed on a remote machine or server.

In the context of the present disclosure, the machine-readable medium may be a tangible medium which may contain or store a program for use by, or used in combination with, an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

As used in the present disclosure, the terms "machine-readable medium" and "computer readable medium" refer to any computer program product, device, and/or apparatus (e.g., a magnetic disk, an optical disk, a memory, or a programmable logic device (PLD)) configured to provide machine instructions and/or data to a programmable processor, and include a machine readable medium receiving machine instructions as machine-readable signals. The term "machine readable signal" refers to any signal used to provide machine instructions and/or data to a programmable processor.

To provide interaction with a user, the systems and technologies described herein may be implemented on a computer that is provided with: a display apparatus (e.g., a CRT (cathode ray tube) or an LCD (liquid crystal display) monitor) configured to display information to the user; and a keyboard and a pointing apparatus (e.g., a mouse or a trackball) by which the user can provide an input to the computer. Other kinds of apparatuses may be further configured to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. A relationship between the client and the server arises by virtue of computer programs that run on corresponding computers and have a client-server relationship with each other.

It should be noted that, in the description of the present disclosure, the terms "first" and "second" are only used for ease of description of different components or names, and cannot be understood as indicating or implying sequential relationship and relative importance or implicitly indicating the number of indicated technical features. Thus, features defined with "first" or "second" may explicitly or implicitly include at least one of the features.

Unless otherwise defined, all technical terms and scientific terms used herein have the same meaning as commonly understood by those skilled in the technical field of the present disclosure. The terms used herein in the description of the present disclosure are only for the purpose of describing specific embodiments, and are not intended to limit the present disclosure.

It should be noted that, the specific embodiments of the present disclosure are described in detail with reference to the accompanying drawings, but should not be understood as imposing any limitation on the scope of protection of the present disclosure. Within the scope described in the claims, various alterations and modifications that can be made by those skilled in the art without making creative work are still encompassed within the scope of protection of the present disclosure.

The examples of the embodiments of the present disclosure are intended to simply illustrate the technical features of the embodiments of the present disclosure, so that those skilled in the art can intuitively understand the technical features of the embodiments of the present disclosure, which are not used to impose any improper limitation on the embodiments of the present disclosure.

Finally, it should be noted that: the above embodiments are merely used to illustrate the technical schemes of the present disclosure, instead of imposing any limitation on the technical schemes. While the present disclosure is described in detail with reference to the above embodiments, those of ordinary skills in the art should understand that: the technical schemes disclosed in the above embodiments may still be modified or a part of the technical features thereof may be replaced equivalently. These modifications or replacements are not intended to make the essence of corresponding technical schemes depart from the spirit and scope of the technical schemes of the embodiments of the present disclosure.

What is claimed is:

1. A method for switching base stations of a mower, the method comprising:
    obtaining, when a number of first common-view satellites between the mower and a first base station is less than a first threshold, a number of second common-view satellites between the mower and a second base station;
    determining, when the number of the first common-view satellites is less than a second threshold and the number of the second common-view satellites is greater than the second threshold, a first coordinate point of the mower where the number of the first common-view satellites is less than or equal to the first threshold as a starting point of a first trajectory and a second trajectory and a first coordinate point of the mower where the number of the first common-view satellites is less than or equal to the second threshold as an end point of the first trajectory and the second trajectory, to obtain the first trajectory of the mower based on the first base station and the second trajectory of the mower based on the second base station, respectively;
    determining, based on the first trajectory and the second trajectory, a coordinate transformation matrix of the mower switching from the first base station to the second base station; and switching the mower from the first base station to the second base station based on the coordinate transformation matrix, the second threshold being less than the first threshold.

2. The method according to claim 1, wherein obtaining the number of second common-view satellites between the mower and the second base station, comprises:
   obtaining a number of candidate common-view satellites between the mower and at least one candidate base station, the candidate base station being a base station in the base stations other than the first base station; and
   selecting a maximum number of the number of candidate common-view satellites as the number of the second common-view satellites between the mower and the second base station.

3. The method according to claim 1, wherein obtaining the first trajectory of the mower based on the first base station and the second trajectory of the mower based on the second base station, respectively, comprises:
   determining a target position of the mower where the number of the first common-view satellites is greater than a third threshold and the number of the second common-view satellites is greater than the third threshold; and
   obtaining coordinate points of the target position based on the first base station as the first trajectory and coordinate points of the target position based on the second base station as the second trajectory, the third threshold being less than the first threshold and greater than the second threshold.

4. The method according to claim 3, wherein obtaining the first trajectory of the mower based on the first base station and the second trajectory of the mower based on the second base station, respectively, further comprises:
   causing the mower to operate based on a sensor on the mower when the number of the first common-view satellites is less than the second threshold and the number of the second common-view satellites is less than the second threshold; and
   using a trajectory of the mower positioned with the sensor on the mower as the first trajectory based on the first base station when the number of the second common-view satellites is greater than the second threshold.

5. The method according to claim 4, wherein using the trajectory of the mower positioned with the sensor on the mower as the first trajectory based on the first base station when the number of the second common-view satellites is greater than the second threshold, comprises:
   acquiring, when the number of the second common-view satellites is greater than the second threshold, coordinate points of the mower positioned with the sensor on the mower, until the number of the second common-view satellites is greater than the first threshold; and
   using the coordinate points positioned with the sensor on the mower as the first trajectory.

6. The method according to claim 1, wherein obtaining the first trajectory of the mower based on the first base station and the second trajectory of the mower based on the second base station, respectively, comprises:
   collecting coordinate points of the mower based on a preset frequency, to determine the starting point and the end point of the first trajectory and the second trajectory, respectively.

7. A mower, comprising:
   a body, a cutterhead and a driving wheel;
   one or more processors; and
   a memory storing a program;
   wherein the program comprises instructions, and the instructions, when executed by the one or more processors, cause the one or more processors to perform a method for switching base stations of the mower, the method comprising:
   obtaining, when a number of first common-view satellites between the mower and a first base station is less than a first threshold, a number of second common-view satellites between the mower and a second base station;
   determining, when the number of the first common-view satellites is less than a second threshold and the number of the second common-view satellites is greater than the second threshold, a first coordinate point of the mower where the number of the first common-view satellites is less than or equal to the first threshold as a starting point of a first trajectory and a second trajectory and a first coordinate point of the mower where the number of the first common-view satellites is less than or equal to the second threshold as an end point of the first trajectory and the second trajectory, to obtain the first trajectory of the mower based on the first base station and the second trajectory of the mower based on the second base station, respectively;
   determining, based on the first trajectory and the second trajectory, a coordinate transformation matrix of the mower switching from the first base station to the second base station; and
   switching the mower from the first base station to the second base station based on the coordinate transformation matrix, the second threshold being less than the first threshold.

8. The mower according to claim 7, wherein obtaining a number of second common-view satellites between the mower and a second base station, comprises:
   obtaining a number of candidate common-view satellites between the mower and at least one candidate base station, the candidate base station being a base station in the base stations other than the first base station; and
   selecting a maximum number of the number of candidate common-view satellites as the number of the second common-view satellites between the mower and the second base station.

9. The mower according to claim 7, wherein obtaining the first trajectory of the mower based on the first base station and the second trajectory of the mower based on the second base station, respectively, comprises:
   determining a target position of the mower where the number of the first common-view satellites is greater than a third threshold and the number of the second common-view satellites is greater than the third threshold; and
   obtaining coordinate points of the target position based on the first base station as the first trajectory, and obtaining coordinate points of the target position based on the second base station as the second trajectory, the third threshold being less than the first threshold and greater than the second threshold.

10. The mower according to claim 9, wherein the instructions, when executed by the processor, also cause the processor to perform:
    causing the mower to operate based on a sensor on the mower when the number of the first common-view satellites is less than the second threshold and the number of the second common-view satellites is less than the second threshold; and
    using a trajectory of the mower positioned with the sensor on the mower as the first trajectory based on the first base station when the number of the second common-view satellites is greater than the second threshold.

11. The mower according to claim 10, wherein using the trajectory of the mower positioned with the sensor on the mower as the first trajectory based on the first base station when the number of the second common-view satellites is greater than the second threshold, comprises:

acquiring, when the number of the second common-view satellites is greater than the second threshold, coordinate points of the mower positioned with the sensor on the mower, until the number of the second common-view satellites is greater than the first threshold; and using the coordinate points positioned with the sensor on the mower as the first trajectory.

12. The mower according to claim 7, wherein obtaining the first trajectory of the mower based on the first base station and the second trajectory of the mower based on the second base station, respectively, comprises:

collecting coordinate points of the mower based on a preset frequency, to determine the starting point and the end point of the first trajectory and the second trajectory, respectively.

13. A multi-base station working system, comprising a mower and a plurality of base stations, wherein, the mower is adapted to acquire a map of a working area of the mower, the map of the working area comprises at least one blocking source, and the working area is divided into a plurality of subareas based on a position of the at least one blocking source;

each of the plurality of the sub-areas is provided with one of the base stations respectively, the sub-area comprises an absolute-dominance area and a cross-dominance area, the absolute-dominance area is an area where the mower has a number of common-view satellites greater than or equal to a preset threshold with only one of the base stations, and the cross-dominance area is an area where a number of common-view satellites between the mower and all of the base stations is less than the preset threshold; and the mower switches between the base stations in the cross-dominance area, to perform mowing in the working area by implementing a method for switching the mower between the base stations, wherein the method comprises:

obtaining, when a number of first common-view satellites between the mower and a first base station is less than a first threshold, a number of second common-view satellites between the mower and a second base station;

determining, when the number of the first common-view satellites is less than a second threshold and the number of the second common-view satellites is greater than the second threshold, a first coordinate point of the mower where the number of the first common-view satellites is less than or equal to the first threshold as a starting point of a first trajectory and a second trajectory and a first coordinate point of the mower where the number of the first common-view satellites is less than or equal to the second threshold as an end point of the first trajectory and the second trajectory, to obtain the first trajectory of the mower based on the first base station and the second trajectory of the mower based on the second base station, respectively;

determining, based on the first trajectory and the second trajectory, a coordinate transformation matrix of the mower switching from the first base station to the second base station; and switching the mower from the first base station to the second base station based on the coordinate transformation matrix, the second threshold being less than the first threshold.

14. The multi-base station working system according to claim 13, wherein obtaining the number of second common-view satellites between the mower and the second base station, comprises:

obtaining a number of candidate common-view satellites between the mower and at least one candidate base station, the candidate base station being a base station in the base stations other than the first base station; and selecting a maximum number of the number of candidate common-view satellites as the number of the second common-view satellites between the mower and the second base station.

15. The multi-base station working system according to claim 13, wherein obtaining the first trajectory of the mower based on the first base station and the second trajectory of the mower based on the second base station, respectively, comprises:

determining a target position of the mower where the number of the first common-view satellites is greater than a third threshold and the number of the second common-view satellites is greater than the third threshold; and obtaining coordinate points of the target position based on the first base station as the first trajectory and coordinate points of the target position based on the second base station as the second trajectory, the third threshold being less than the first threshold and greater than the second threshold.

16. The multi-base station working system according to claim 15, wherein obtaining the first trajectory of the mower based on the first base station and the second trajectory of the mower based on the second base station, respectively, further comprises:

causing the mower to operate based on a sensor on the mower when the number of the first common-view satellites is less than the second threshold and the number of the second common-view satellites is less than the second threshold; and using a trajectory of the mower positioned with the sensor on the mower as the first trajectory based on the first base station when the number of the second common-view satellites is greater than the second threshold.

17. The multi-base station working system according to claim 16, wherein obtaining the first trajectory of the mower based on the first base station and the second trajectory of the mower based on the second base station, respectively, comprises:

collecting coordinate points of the mower based on a preset frequency, to determine the starting point and the end point of the first trajectory and the second trajectory, respectively.

18. The multi-base station working system according to claim 16, wherein using the trajectory of the mower positioned with the sensor on the mower as the first trajectory based on the first base station when the number of the second common-view satellites is greater than the second threshold, comprises:

acquiring, when the number of the second common-view satellites is greater than the second threshold, coordinate points of the mower positioned with the sensor on the mower, until the number of the second common-view satellites is greater than the first threshold; and using the coordinate points positioned with the sensor on the mower as the first trajectory.

* * * * *